US012669328B2

(12) United States Patent
Zhang et al.

(10) Patent No.: US 12,669,328 B2
(45) Date of Patent: Jun. 30, 2026

(54) CONSTRUCTION SURFACE FLATNESS DETECTOR

(71) Applicant: CHANGZHOU HUADA KEJIE OPTO-ELECTRO INSTRUMENT, Changzhou (CN)

(72) Inventors: Ou Zhang, Changzhou (CN); Weiping Zhu, Changzhou (CN); Kai Fei, Changzhou (CN)

(73) Assignee: CHANGZHOU HUADA KEJIE OPTO-ELECTRO INSTRUMENT CO., LTD, Changzhou City (CN)

( * ) Notice: Subject to any disclaimer, the term of this patent is extended or adjusted under 35 U.S.C. 154(b) by 305 days.

(21) Appl. No.: 18/593,011

(22) Filed: Mar. 1, 2024

(65) Prior Publication Data

US 2024/0295396 A1      Sep. 5, 2024

(30) Foreign Application Priority Data

Mar. 2, 2023    (CN) .......................... 202310191724.8
Mar. 2, 2023    (CN) .......................... 202320366932.2

(51) Int. Cl.
*G01B 11/30*         (2006.01)
*G01C 9/34*          (2006.01)
               (Continued)

(52) U.S. Cl.
CPC ................ *G01B 11/30* (2013.01); *G01C 9/34* (2013.01); *G01C 15/002* (2013.01); *G01C 25/00* (2013.01)

(58) Field of Classification Search
CPC .............................. G01C 15/02; G01C 15/004
               (Continued)

(56) References Cited

U.S. PATENT DOCUMENTS 3,865,491 A * 2/1975 Hogan ................. G01C 15/004
                                                356/141.2
4,062,634 A * 12/1977 Rando .................... G01B 11/26
                                                356/248

(Continued)

FOREIGN PATENT DOCUMENTS

JP          2000329707 A * 11/2000  ............. G01N 21/57

*Primary Examiner* — George B Bennett
(74) *Attorney, Agent, or Firm* — BRYAN CAVE LEIGHTON PAISNER LLP

(57) ABSTRACT

The present disclosure relates to the field of building construction, in particular to construction detection equipment. The present disclosure relates to a construction surface flatness detector, which comprises a housing mounted on a base. An inclination adjustment mechanism, a levelness calibration unit, a height adjustment mechanism and a rotation mechanism are mounted between the housing and the base; a pair of laser line projecting units for emitting laser lines in parallel is symmetrically mounted at two ends of the housing; a certain included angle is formed between laser sectors projected by the pair of laser line projecting units; and intersecting lines of the laser sectors are located on a horizontal plane where the base is located. According to the present disclosure, the line projection is performed on a construction surface by a pair of the laser line projecting units, which project laser lines in parallel and form projected sectors with a certain included angle; and intersecting lines are overlapped on the construction surface by controlling the included angle of the sectors and the height of the laser line projecting units relative to the construction surface, so that the flatness of the construction surface can be identified intuitively through the bifurcation of a pair of lasers, and the detection speed is high; and concave-convex values can be directly obtained after a specific angle is selected as the included angle of the sectors, to further improve the detection performance.

12 Claims, 3 Drawing Sheets

(51) Int. Cl.
    *G01C 15/00*    (2006.01)
    *G01C 25/00*    (2006.01)
(58) Field of Classification Search
    USPC ......................................... 33/227, 27 R–286
    See application file for complete search history.

(56)                    References Cited

U.S. PATENT DOCUMENTS

| | | | | |
|---|---|---|---|---|
| 4,333,242 | A * | 6/1982 | Genho, Sr. ............. | G01B 11/27 |
| | | | | 33/290 |
| 5,604,987 | A * | 2/1997 | Cupp ................... | G01C 15/008 |
| | | | | 33/290 |
| 5,606,802 | A * | 3/1997 | Ogawa ................ | G01C 15/105 |
| | | | | 356/138 |
| 5,748,306 | A * | 5/1998 | Louis ..................... | G01B 11/26 |
| | | | | 356/153 |
| 5,782,002 | A * | 7/1998 | Reed ...................... | F41G 1/467 |
| | | | | 33/DIG. 1 |
| 5,864,956 | A * | 2/1999 | Dong ................... | G01C 15/105 |
| | | | | 33/286 |
| 5,872,657 | A * | 2/1999 | Rando ................. | G01C 15/004 |
| | | | | 33/290 |
| 6,014,211 | A * | 1/2000 | Middleton .......... | G01C 15/004 |
| | | | | 356/250 |
| 6,430,823 | B1 * | 8/2002 | Seki .................... | G01C 15/004 |
| | | | | 33/286 |
| 6,453,568 | B1 * | 9/2002 | Hymer ................ | G01C 15/008 |
| | | | | 33/278 |
| 6,931,737 | B1 * | 8/2005 | Liao ..................... | G01C 15/004 |
| | | | | 33/286 |
| 7,116,697 | B1 * | 10/2006 | Dong ................... | G01C 15/004 |
| | | | | 33/227 |
| 7,513,051 | B2 * | 4/2009 | Spanski ............... | G01C 15/004 |
| | | | | 33/286 |
| 7,797,846 | B2 * | 9/2010 | Walser ................... | A63C 19/06 |
| | | | | 33/290 |
| 8,104,186 | B2 * | 1/2012 | Raschella ................ | F41G 1/35 |
| | | | | 42/114 |
| 9,057,607 | B2 * | 6/2015 | Travis .................. | G01C 15/004 |
| 9,441,963 | B2 * | 9/2016 | Yuen .................... | G01C 15/004 |
| 9,518,823 | B2 * | 12/2016 | Hill ....................... | G01C 15/004 |
| 10,508,916 | B2 * | 12/2019 | Huang ..................... | G01C 9/24 |
| 10,900,781 | B2 * | 1/2021 | Sullivan .............. | G01C 15/002 |
| 11,125,557 | B1 * | 9/2021 | Riley ................... | G01C 15/008 |
| 11,307,032 | B2 * | 4/2022 | Zhuang ............... | G01C 15/008 |
| 11,320,264 | B2 * | 5/2022 | Melton ............... | G01C 15/105 |
| 11,629,958 | B2 * | 4/2023 | Sullivan .............. | G01C 15/002 |
| | | | | 33/286 |
| 2005/0022399 | A1 * | 2/2005 | Wheeler .............. | G01C 15/002 |
| | | | | 33/286 |
| 2005/0198845 | A1 * | 9/2005 | Robinson ............ | G01C 15/004 |
| | | | | 33/227 |
| 2005/0278966 | A1 * | 12/2005 | Liu ....................... | G01C 15/004 |
| | | | | 33/286 |
| 2006/0283029 | A1 * | 12/2006 | Jan ........................ | G01C 15/002 |
| | | | | 33/286 |
| 2007/0011894 | A1 * | 1/2007 | Chen .................... | G01C 15/004 |
| | | | | 33/286 |
| 2008/0276472 | A1 * | 11/2008 | Riskus ................. | G01C 15/008 |
| | | | | 33/284 |
| 2016/0166333 | A1 * | 6/2016 | Wang ..................... | A61B 34/10 |
| | | | | 600/476 |
| 2019/0162536 | A1 * | 5/2019 | Zhang ..................... | G01S 17/08 |
| 2023/0045402 | A1 * | 2/2023 | Pohlmann ............ | G01C 15/008 |
| 2025/0146818 | A1 * | 5/2025 | Zhang ................. | G01C 15/004 |

* cited by examiner

CONSTRUCTION SURFACE FLATNESS DETECTOR

CROSS-REFERENCE TO RELATED APPLICATIONS

The present application claims priority to Chinese Patent Application No. 2023101917248, filed on Mar. 2, 2023 and Chinese Patent Application No. 2023203669322, filed on Mar. 2, 2023, the disclosure of which are incorporated herein by reference.

TECHNICAL FIELD

The present disclosure relates to the field of building construction, in particular to construction detection equipment.

BACKGROUND

With the development of domestic home decoration and construction industry, the requirements on walls and floors before and after construction, including the width of the bay, are becoming increasingly higher. Especially, floors are being laid more directly, and there is a growing demand for products that can rapidly and effectively detect the flatness of walls and floors in the market.

Traditional line projecting instruments/leveling instruments can achieve this measurement purpose through lofting and single-point measurement combined with a level bar, but the measurement efficiency is low, and it is difficult to completely cover all working surfaces. Eventually, rework will be required due to unevenness in certain positions. Therefore, a fast and efficient measuring equipment that can complete the measurement of the entire wall and floor is needed.

SUMMARY

The present disclosure provides a construction surface flatness detector; according to the present invention, the line projection is performed on a construction surface by a pair of the laser line projecting units, which project laser lines in parallel and form projected sectors with a certain included angle; and intersecting lines are overlapped on the construction surface by controlling the included angle of the sectors and the height of the laser line projecting units relative to the construction surface, so that the flatness of the construction surface can be identified intuitively through the bifurcation of a pair of lasers, and the detection speed is high.

the present disclosure is realized as follows: a construction surface flatness detector, which comprises a housing mounted on a base, wherein an inclination adjustment mechanism, a levelness calibration unit, a height adjustment mechanism and a rotation mechanism are mounted between the housing and the base; a pair of laser line projecting units for emitting laser lines in parallel is symmetrically mounted at two ends of the housing; a certain included angle is formed between laser sectors projected by a pair of the laser line projecting units; and intersecting lines of the laser sectors are located on a horizontal plane where the base is located.

The included angle α of the laser sectors projected by a pair of the laser line projecting units is 53.13 degrees.

Colors of the lasers projected by a pair of the laser line projecting units are different.

A battery bin is further mounted on the housing; and the battery bin is electrically connected with a pair of the laser line projecting units.

The battery bin is mounted in the middle of the housing.

The levelness calibration unit comprises two horizontal bubbles arranged in a crisscross manner and a vertical bubble; and the vertical bubble is located at a symmetrical axis position of a pair of the laser line projecting units.

The inclination adjustment mechanism comprises a foot screw and an inclined base.

The rotation mechanism comprises a fine adjustment screw and a rotary base; and the fine adjustment screw is connected with the rotary base.

The height adjustment mechanism comprises a lifting adjustment nut; and the height of the housing relative to the base is adjusted by rotating the lifting adjustment nut, so that the intersecting lines of the laser sectors projected by a pair of the laser line projecting units are located on a horizontal plane where the base is located.

A flatness error is set to A; and a width of laser beams of a pair of the laser line projecting units is equal to A.

According to the present disclosure, the line projection is performed on a construction surface by a pair of the laser line projecting units, which project laser lines in parallel and form projected sectors with a certain included angle; and intersecting lines are overlapped on the construction surface by controlling the included angle of the sectors and the height of the laser line projecting units relative to the construction surface, so that the flatness of the construction surface can be identified intuitively through the bifurcation of a pair of lasers, and the detection speed is high; and concave-convex values can be directly obtained after a specific angle is selected as the included angle of the sectors, to further improve the detection performance.

Figure 1:
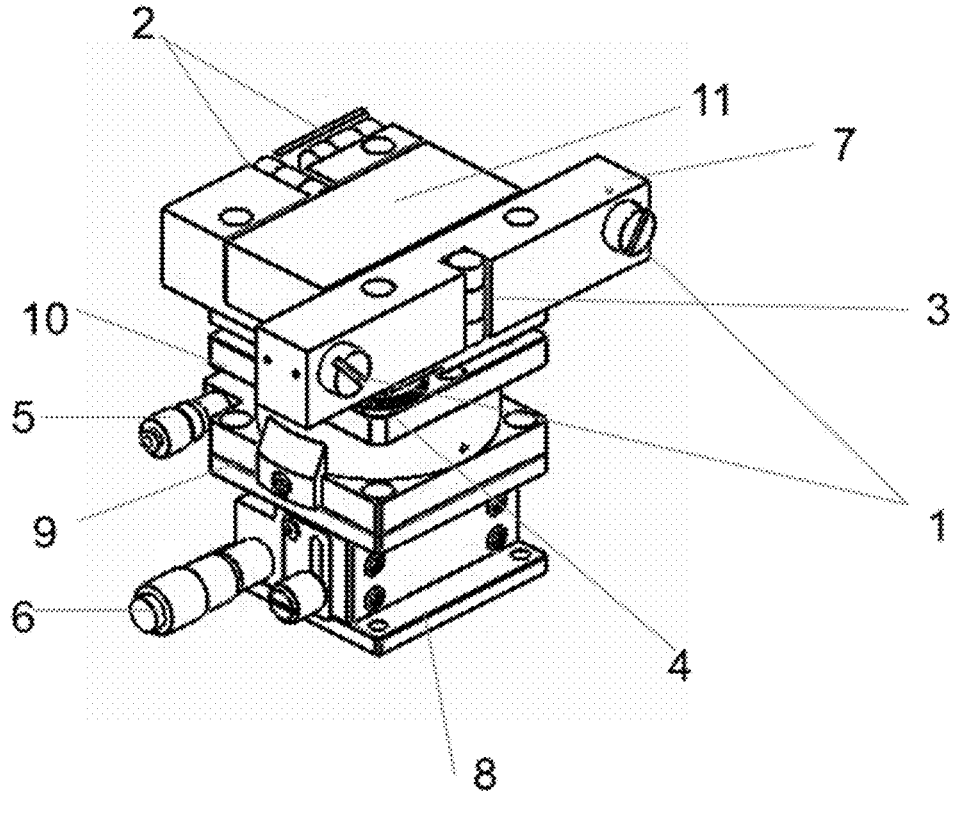
FIG. 1 is a structural schematic diagram of a construction surface flatness detector according to the present disclosure.

In the drawings: 1—laser line projecting unit, 2—horizontal bubble, 3—vertical bubble, 4—foot screw, 5—fine adjustment screw, 6—lifting adjustment nut, 7—housing, 8—base, 9—rotary base, 10—inclined base and 11—battery bin.

DETAILED DESCRIPTION

The present disclosure will be further described below with reference to embodiments. It should be noted that these embodiments are not intended to define the scope of the present disclosure but merely to describe the present disclosure. In addition, it should be understood that those of skill in the art can make various alterations or modifications to the present disclosure after reading the present disclosure, and these equivalent forms shall also fall within the scope defined by the claims appended to the present disclosure.

Embodiment 1

Figure 2:
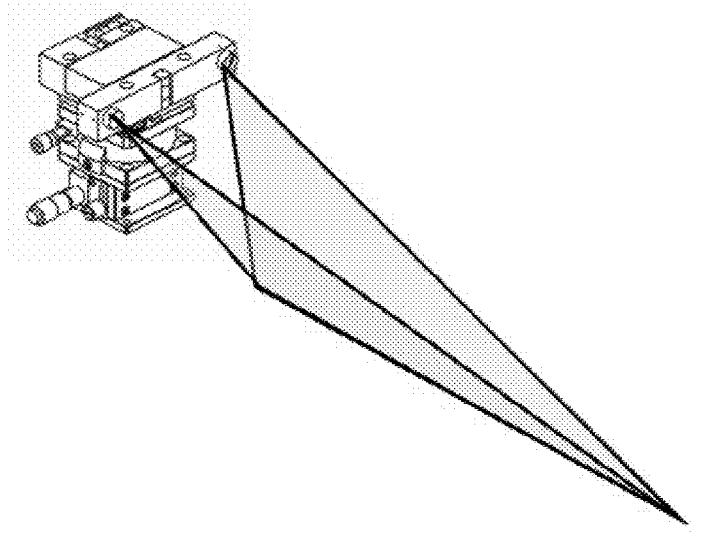
FIG. 2 is a schematic diagram of laser projection according to the present disclosure.

As shown in FIG. 1 and FIG. 2, a construction surface flatness detector, which comprises a housing 7 mounted on a base 8, wherein an inclination adjustment mechanism, a levelness calibration unit, a height adjustment mechanism and a rotation mechanism are mounted between the housing 7 and the base 8; a pair of laser line projecting units 1 for emitting laser lines in parallel is symmetrically mounted at two ends of the housing 7; a certain included angle is formed between laser sectors projected by a pair of the laser line projecting units 1; and intersecting lines of the laser sectors are located on a horizontal plane where the base 8 is located.

Figure 3:
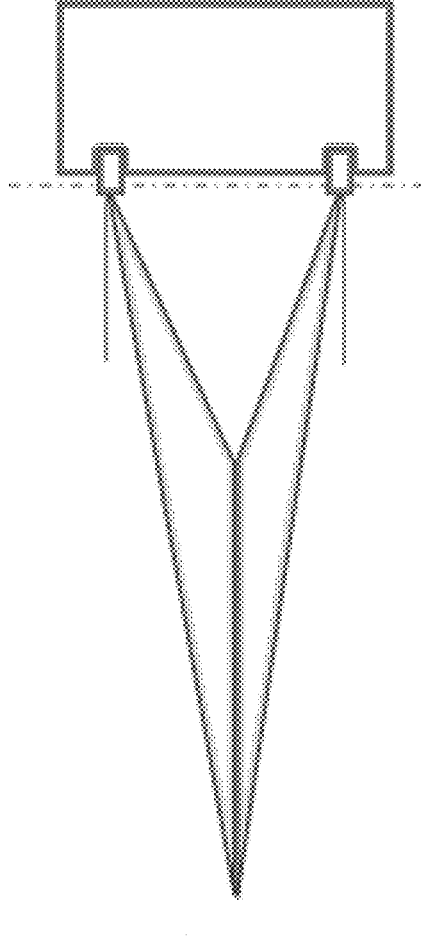
FIG. 3 is a top view of laser projection when a construction surface is even.
Figures 4, 5:
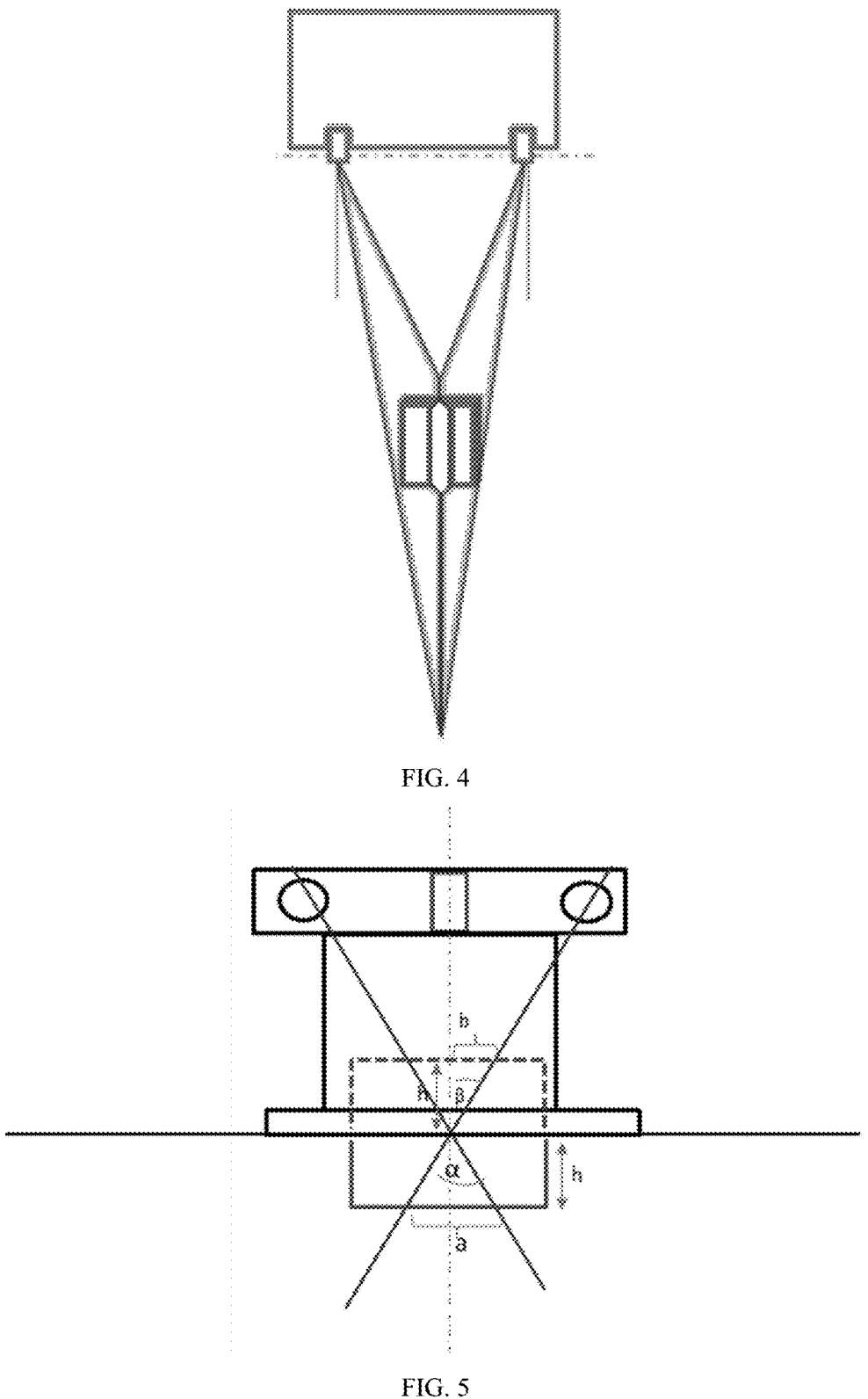
FIG. 4 is a top view of laser projection when a construction surface is uneven.
FIG. 5 is a schematic diagram of a calculated angle in the present embodiment.

As shown in FIG. 3, FIG. 4 and FIG. 5, in the present disclosure, in order to enable a user to intuitively obtain concave-convex values corresponding to the unevenness, the included angle $\alpha$ of the laser sectors projected by a pair of the laser line projecting units 1 is 53.13 degrees. The included angle is specifically calculated as follows:

Calculating by Forward Pass:

It is necessary that a=h, and the inclined angle of two laser sectors forms an isosceles triangle, so b=a/2, then b/h=0.5. An angle $\beta$ can be deduced according to formulas of trigonometric functions as follows: tan $\beta$=b/h=0.5, that is, $\beta$=arctan(0.5). Therefore, it can be calculated that $\beta \approx 26.565°$ and $\alpha=2\beta=2*26.565=53.13°$.

Verifying by Backward Pass:

When $\alpha=53.13°$ and the inclination angles of two red laser lines are equal, $\beta=26.565°$. Therefore, tan $\beta$=b/h=0.5, then a=2b=h.

In addition, in order to directly and intuitively distinguish whether the uneven construction surface is concave or convex, the colors of lasers projected by a pair of the laser line projecting units 1 are different. Therefore, when the lines projected by a pair of the laser line projecting units 1 on the construction surface is bifurcated, it can be judged by left and right positions of the projected lines in two colors.

In consideration of the reasonable layout of equipment structure and the requirement of on-site construction without external power supply, a battery bin 11 is further mounted on the housing 7; and the battery bin 11 is electrically connected with a pair of the laser line projecting units 1. In the present embodiment, the battery bin 11 is preferably mounted in the middle of the housing 7.

In the present disclosure, the levelness calibration unit comprises two horizontal bubbles 2 arranged in a crisscross manner and a vertical bubble 3; and the vertical bubble 3 is located at a symmetrical axis position of a pair of the laser line projecting units 1. The inclination adjustment mechanism comprises a foot screw 4 and an inclined base 10; and the horizontal bubbles 2 and the vertical bubble 3 are centered by adjusting the foot screw 4 and the inclined base 10.

In addition, in order to scan across the whole construction surface directly without changing the base state during detection and simplify the working steps, the rotation mechanism includes a fine adjustment screw 5 and a rotary base 9; and the fine adjustment screw 5 is connected with the rotary base 9; for the convenience of operation, the rotation mechanism is driven by a motor and operated by a remote controller.

In the present disclosure, the height adjustment mechanism comprises a lifting adjustment nut 6; and the height of the housing 7 relative to the base 8 is adjusted by rotating the lifting adjustment nut 6, so that the intersecting lines of the laser sectors projected by a pair of the laser line projecting units 1 are located on a horizontal plane where the base is located 8.

In the present embodiment, in order to more intuitively distinguish whether a flatness error exceeds the standard during detection, when the flatness error is required to be A, a width of laser beams of a pair of the laser line projecting units 1 is equal to A.

When in use, the base 8 is first placed on the construction surface; and then the levelness of the housing 7 is adjusted by the inclination adjustment mechanism in combination with the observation by the levelness calibration unit. After the housing 7 is leveled, the laser line projecting unit 1 is turned on, and the lifting adjustment nut 6 is adjusted, so that the lines projected by a pair of the laser line projecting units 1 on the construction surface are overlapped. Then, the rotation mechanism is used to perform rotary line projection, so that the projected lines scan across the whole construction surface, and the flatness of the construction surface can be rapidly detected. As long as the laser line is not split, it means that the flatness of the whole surface is ≤±A.

The invention claimed is:

1. A construction surface flatness detector, which comprises a housing mounted on a base, wherein an inclination adjustment mechanism, a levelness calibration unit, a height adjustment mechanism and a rotation mechanism are mounted between the housing and the base; a pair of laser line projecting units for emitting laser lines in parallel is symmetrically mounted at two ends of the housing; a certain included angle is formed between laser sectors projected by a pair of the laser line projecting units; and intersecting lines of the laser sectors are located on a horizontal plane where the base is located.

2. The construction surface flatness detector of claim 1, wherein the included angle $\alpha$ of the laser sectors projected by a pair of the laser line projecting units is 53.13 degrees.

3. The construction surface flatness detector of claim 1, wherein colors of the lasers projected by a pair of the laser line projecting units are different.

4. The construction surface flatness detector of claim 1, wherein a battery bin is further mounted on the housing; and the battery bin is electrically connected with a pair of the laser line projecting units.

5. The construction surface flatness detector of claim 4, wherein the battery bin is mounted in the middle of the housing.

6. The construction surface flatness detector of claim 4, wherein the levelness calibration unit comprises two horizontal bubbles arranged in a crisscross manner and a vertical bubble; the vertical bubble is located at a symmetrical axis position of a pair of the laser line projecting units.

7. The construction surface flatness detector of claim 6, wherein the inclination adjustment mechanism comprises a foot screw and an inclined base; and the horizontal bubbles and the vertical bubble are centered by adjusting the foot screw and the inclined base.

8. The construction surface flatness detector of claim 4, wherein the rotation mechanism comprises a fine adjustment screw and a rotary base; and the fine adjustment screw is connected with the rotary base.

9. The construction surface flatness detector of claim 4, wherein the height adjustment mechanism comprises a lifting adjustment nut; and the height of the housing relative to the base is adjusted by rotating the lifting adjustment nut, so that the intersecting lines of the laser sectors projected by a pair of the laser line projecting units are located on a horizontal plane where the base is located.

10. The construction surface flatness detector of claim 4, wherein a flatness error is set to A; and a width of laser beams of a pair of the laser line projecting units is equal to A.

11. The construction surface flatness detector of claim 2, wherein a battery bin is further mounted on the housing; and the battery bin is electrically connected with a pair of the laser line projecting units.

12. The construction surface flatness detector of claim 3, wherein a battery bin is further mounted on the housing; and the battery bin is electrically connected with a pair of the laser line projecting units.

* * * * *